US007212956B2

(12) United States Patent
Bruno et al.

(10) Patent No.: US 7,212,956 B2
(45) Date of Patent: May 1, 2007

(54) METHOD AND SYSTEM OF REPRESENTING AN ACOUSTIC FIELD

(76) Inventors: Rémy Bruno, 23 Avenue Eva Salmon, 94400 Vitry sur Seine (FR); Arnaud Laborie, 24 bis rue Arago, 94400 Vitry sur Seine (FR); Sébastien Montoya, 4, Rue Gaston Pinot, 75019 Paris (FR)

( * ) Notice: Subject to any disclaimer, the term of this patent is extended or adjusted under 35 U.S.C. 154(b) by 0 days.

(21) Appl. No.: 10/513,871

(22) PCT Filed: May 6, 2003

(86) PCT No.: PCT/FR03/01410

§ 371 (c)(1),
(2), (4) Date: Apr. 21, 2005

(87) PCT Pub. No.: WO03/096742

PCT Pub. Date: Nov. 20, 2003

(65) Prior Publication Data

US 2005/0177606 A1 Aug. 11, 2005

(30) Foreign Application Priority Data

May 7, 2002 (FR) .................................. 02 05741

(51) Int. Cl.
*G06F 3/01* (2006.01)

(52) U.S. Cl. ...................... 702/190; 702/191; 702/196; 702/197

(58) Field of Classification Search .................. 702/71, 702/77, 122, 125, 159, 189, 191, 196, 197; 73/633; 367/124; 381/71.5; 700/94
See application file for complete search history.

(56) References Cited

U.S. PATENT DOCUMENTS

| | | | | |
|---|---|---|---|---|
| 4,060,850 | A | 11/1977 | Speiser | 708/813 |
| 5,216,640 | A * | 6/1993 | Donald et al. | 367/124 |
| 6,201,872 | B1 * | 3/2001 | Hersh et al. | 381/71.5 |
| 6,216,540 | B1 * | 4/2001 | Nelson et al. | 73/633 |
| 2001/0029049 | A1 * | 10/2001 | Walt et al. | 436/518 |

FOREIGN PATENT DOCUMENTS

| | | |
|---|---|---|
| EP | 0 381 498 | 8/1990 |
| JP | 2001-125578 | 5/2001 |

* cited by examiner

*Primary Examiner*—Marc S. Hoff
*Assistant Examiner*—Felix Suarez
(74) *Attorney, Agent, or Firm*—Young & Thompson

(57) ABSTRACT

A method of representing a sound field includes the steps of acquiring measurement signals ($c_n$) which are delivered by simple sensors ($2_n$) that are exposed to sound field (P) determining encoding filters which are representative of at least the structural characteristics of the sensors and processing the measurement signals ($c_n$) by applying the encoding filters to the signals ($c_n$), in order to determine a finite number of representative coefficients over time and in the three-dimensional space of the sound field (P).

22 Claims, 5 Drawing Sheets

METHOD AND SYSTEM OF REPRESENTING AN ACOUSTIC FIELD

The present invention relates to a method and a device for representing an acoustic field from signals issued by acquisition means.

BACKGROUND OF THE INVENTION

Current methods and systems for acquiring and representing sound environments use models based on acquisition means that are physically impracticable, in particular as far as the electro-acoustic and/or structural characteristics of these acquisition means are concerned.

The acquisition means comprise, for example, a set of measuring elements or elementary sensors arranged in specific spatial locations and having intrinsic electro-acoustic acquisition characteristics.

The current systems are limited by the structural characteristics of the acquisition means, such as the physical arrangement and electro-acoustic characteristics of the elementary sensors, and issue degraded representations of the sound environment to be acquired.

The systems subsumed under the term "Ambisonic", for example, only consider the directions of the source of sounds relative to the centre of the acquisition means comprising a plurality of elementary sensors, which results in the acquisition means being equivalent to a point microphone.

However, the impossibility of positioning all of the elementary sensors at a single point limits the efficiency of these systems.

Furthermore, these systems represent the sound environment by modelling virtual sources, the angular distribution of which around the centre theoretically allows a sound environment of this type to be obtained.

However, the unavailability of elementary sensors having high directivity characteristics limits these systems to a level of representation precision that is commonly known as "order one", on a mathematical basis known as the basis of spherical harmonics.

In other systems, such as that employing the method and the acquisition device disclosed in patent application No. WO-01-58209, the acquisition is based on the measurement, in a plane, of information that is representative of the sound environment to be acquired.

However, these systems use models based on optimal elementary sensors that are necessarily arranged on a circle and cause significant amplification of the background noise of the sensors.

These systems therefore require sensors of which the intrinsic background noise is extremely low, and are thus impracticable.

Furthermore, in these systems, the sound environment is only described by a bi-dimensional model, which entails a significant and reductive approximation of the real sound characteristics.

It would therefore seem that the representations of sound environments made by the current systems are incomplete and degraded, and that there is no system that allows a faithful representation to be obtained.

SUMMARY OF THE INVENTION

The object of the invention is to solve this problem by providing a method and a device issuing a representation of the acoustic field that is substantially independent of the characteristics of the acquisition means.

The present invention relates to a method for representing an acoustic field comprising a step involving the acquisition of measurement signals issued by acquisition means comprising one or more elementary sensors that are exposed to said acoustic field, characterised in that it comprises:

- a step involving the determination of encoding filters that are representative of at least the structural characteristics of said acquisition means; and
- a step involving the processing of said measurement signals by applying said encoding filters to these signals in order to determine a finite number of coefficients representative over time and in the three-dimensional space of said acoustic field, said coefficients allowing a representation of said acoustic field to be obtained that is substantially independent of the characteristics of said acquisition means.

According to other characteristics:

- said structural characteristics comprise at least position characteristics of said elementary sensors relative to a predetermined reference point of said acquisition means;
- encoding filters are also representative of electro-acoustic characteristics of said acquisition means;
- said electro-acoustic characteristics comprise at least characteristics related to the intrinsic electro-acoustic acquisition capacities of said elementary sensors;
- coefficients allowing a representation of the acoustic field to be obtained are what are known as Fourier-Bessel coefficients and/or linear combinations of Fourier-Bessel coefficients;
- step involving the determination of the encoding filters comprises:
  - a sub-step involving the determination of a sampling matrix that is representative of the acquisition capacities of said acquisition means;
  - a sub-step involving the determination of an intercorrelation matrix that is representative of the similarity between said measurement signals issued by the elementary sensors forming said acquisition means; and
  - a sub-step involving the determination of an encoding matrix from said sampling matrix, said intercorrelation matrix and a parameter that is representative of a desired compromise between faithfulness of representation of the acoustic field and minimisation of the background noise caused by the acquisition means, which matrix is representative of said encoding filters;
- sub-steps involving the determination of the matrices are carried out for a finite number of operating frequencies;
- step involving the determination of the sampling matrix is carried out, for each of said elementary sensors forming said acquisition means, from:
  - parameters that are representative of the position of said sensor relative to the centre of said acquisition means; and/or
  - a finite number of coefficients that are representative of the acquisition capacities of said sensor;
- step involving the determination of the sampling matrix (B) is also carried out from at least one of the following parameters:
  - parameters that are representative of the frequency responses of all or some of the sensors;
  - parameters that are representative of the directivity patterns of all or some of the sensors;

parameters that are representative of the orientations of all or some of the sensors, i.e. of their maximum sensitivity direction;

parameters that are representative of the power spectral densities of the background noise of all or some of the sensors;

a parameter specifying the order in which the representation is conducted;

a parameter that is representative of a list of coefficients, the power of which must be equal to the power of the corresponding coefficient in the acoustic field to be represented;

it comprises a calibration step allowing all or some of the parameters used in said step involving the determination of the encoding filters, to be issued;

calibration step comprises, for at least one of said elementary sensors forming said acquisition means:

a sub-step involving the acquisition of signals that are representative of the acquisition capacities of said at least one sensor; and a sub-step involving the determination of parameters representative of electro-acoustic and/or structural characteristics of said at least one sensor;

calibration step further comprises:

a sub-step involving the emission of a specific acoustic field toward said at least one sensor, said acquisition sub-step corresponding to the acquisition of the signals issued by this sensor when it is exposed to said specific acoustic field; and a sub-step involving the modelling of said specific acoustic field in a finite number of coefficients, in order to allow said sub-step involving the determination of parameters that are representative of electro-acoustic and/or structural characteristics of the sensor to be carried out;

said calibration step comprises a sub-step involving the reception of a finite number of signals that are representative of the electro-acoustic and structural characteristics of said sensors forming said acquisition means, which signals are used directly during said sub-step involving the determination of the electro-acoustic and/or structural characteristics of said acquisition means; and it comprises an input step allowing all or some of the parameters used during said step involving the determination of the encoding filters, to be determined.

The invention also relates to a computer programme comprising programme code instructions for implementing the steps of the method as described above, when said programme is executed on a computer.

The invention also relates to a movable support of the type comprising at least one operation processor and a non-volatile memory element, characterised in that said memory comprises a programme comprising code instructions for implementing the steps of the method as described above, when said processor executes said programme.

The invention also relates to a device for representing an acoustic field that is connectable to acquisition means comprising one or more elementary sensors issuing measurement signals when they are exposed to said acoustic field, characterised in that it comprises a module for processing the measurement signals by applying encoding filters that are representative of at least the structural characteristics of said acquisition means to these measurement signals, in order to issue a signal that comprises a finite number of coefficients representative over time and in the three-dimensional space of said acoustic field, said coefficients allowing a representation of said acoustic field to be obtained that is substantially independent of the characteristics of said acquisition means.

According to other characteristics of the invention:

encoding filters are also representative of electro-acoustic characteristics of said acquisition means;

it further comprises means for determining said encoding filters that are representative of structural and/or electro-acoustic characteristics of said acquisition means;

said means for determining encoding filters receive at the input at least one of the following parameters:

parameters that are representative of the positions, relative to centre of said acquisition means, of all or some of the sensors;

a finite number of coefficients that are representative of the acquisition capacities of all or some of the sensors;

parameters that are representative of the frequency responses of all or some of the sensors;

parameters that are representative of the directivity patterns of all or some of the sensors;

parameters that are representative of the orientations of all or some of the sensors, i.e. of their maximum sensitivity direction;

parameters that are representative of the power spectral densities of the background noise of all or some of the sensors;

a parameter that is representative of the desired compromise between faithfulness of representation of the acoustic field and minimisation of the background noise caused by the acquisition means;

a parameter specifying the order in which the encoding is conducted;

a parameter that is representative of a list of coefficients, the power of which must be equal to the power of the corresponding coefficient in the acoustic field to be represented;

it is associated with means for determining all or some of the parameters received by said means for determining the encoding filters, said means comprising at least one of the following elements:

means for inputting parameters; and/or calibration means;

it is associated with means for formatting said measurement signals, in order to issue a corresponding formatted signal.

BRIEF DESCRIPTION OF THE DRAWINGS

A better understanding of the invention will be facilitated by reading the following description, given solely by way of example and with reference to the accompanying drawings, in which.

DETAILED DESCRIPTION OF THE PREFERRED EMBODIMENTS

Figure 1:
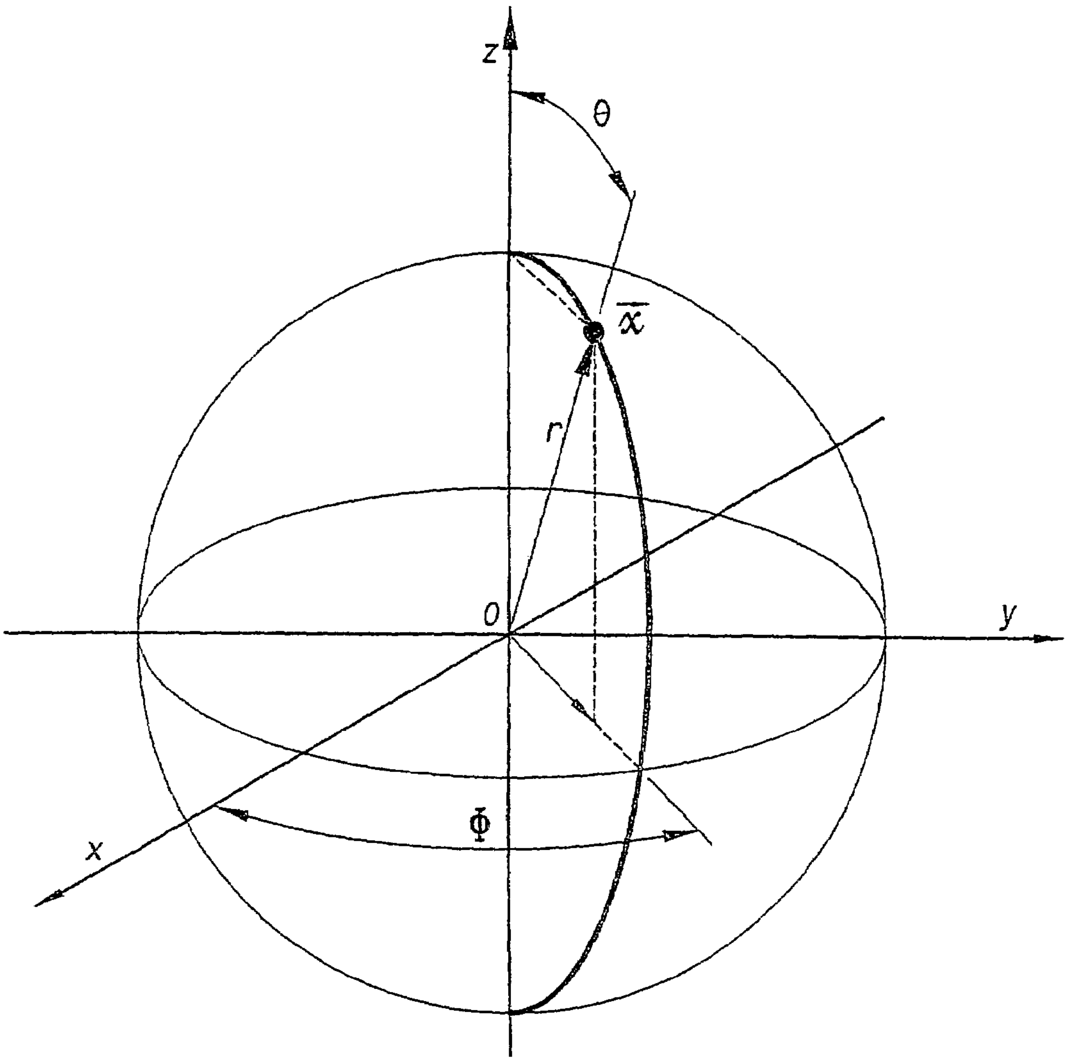
FIG. 1 is an illustration of a spherical reference figure.

FIG. 1 illustrates a conventional spherical reference figure, so as to clarify the coordinate system referred to in the text.

This reference figure is an orthonormal reference figure, having an origin 0 and comprising three axes (OX), (OY) and (OZ).

In this reference figure, a position marked $\vec{x}$ is described by means of its spherical coordinates (r, θ, φ), wherein r denotes the distance relative to the origin O, θ the orientation in the vertical plane and φ the orientation in the horizontal plane.

In a reference figure of this type, an acoustic field is known if the sound pressure marked p(r, θ, φ, t), the Fourier transform of which is marked P(r, θ, φ, f), wherein f denotes the frequency, is defined at each point and at each instant t.

The method of the invention is based on the use of spatio-temporal functions allowing any acoustic field over time and in three-dimensional space to be described.

In the described embodiments these functions are what are known as spherical Fourier-Bessel functions of the first kind referred to hereinafter as Fourier-Bessel functions.

In a zone devoid of sources and obstacles, the Fourier-Bessel functions correspond to solutions to the wave equation and form a basis that generates all of the acoustic fields produced by sources located outside this zone.

Any three-dimensional acoustic field may thus be expressed by a linear combination of Fourier-Bessel functions, according to the expression of the inverse Fourier-Bessel transform, which is expressed as follows:

$$P(r,\theta,\phi,f)=4\pi\sum_{l=0}^{\infty}\sum_{m=-l}^{l}P_{l,m}(f)j^{l}j_{l}(kr)y_{l}^{m}(\theta,\phi)$$

In this equation, the terms $P_{l,m}(f)$ are defined as the Fourier-Bessel coefficients of the field p(r, θ, φ, t), $$k=k=\frac{2\pi f}{c},$$

c is the velocity of sound in air (340 $ms^{-1}$), $j_l$ (kr) is the spherical Bessel function of the first kind of order l, defined by $$j_l(x)=\sqrt{\frac{\pi}{2x}}J_{l+1/2}(x),$$

wherein $J_v(x)$ is the Bessel function of the first kind of order v, and $y_l^m(\theta, \phi)$ is the real spherical harmonic of order l and term m, with m ranging from −l to l, defined by:

$$y_l^m(\theta,\phi)=P_l^{|m|}(\cos\theta)trg_m(\phi)$$

wherein:

$$trg_m(\phi)=\begin{cases}\frac{1}{\sqrt{\pi}}\cos(m\phi) & \text{where } m>0\\ \frac{1}{\sqrt{2\pi}} & \text{where } m=0\\ \frac{1}{\sqrt{\pi}}\sin(m\phi) & \text{where } m<0\end{cases}$$

In this equation, $P_l^m(x)$ are the associated Legendre functions, defined by:

$$P_l^m(x)=\sqrt{\frac{2l+1}{2}}\sqrt{\frac{(l-m)!}{(l+m)!}}(1-x^2)^{m/2}\frac{d^m}{dx^m}P_l(x)$$

wherein $P_l(x)$ are Legendre polynomials, defined by:

$$P_l(x)=\frac{1}{2^l l!}\frac{d^l}{dx^l}(x^2-1)^l$$

The Fourier-Bessel coefficients are also expressed in the temporal domain by the coefficients $p_{l,m}(t)$, corresponding to the inverse temporal Fourier transform of the coefficients $P_{l,m}(f)$.

In other embodiments, the acoustic field is decomposed on a function base, wherein each of the functions is expressed by a potentially infinite linear combination of Fourier-Bessel functions.

Figure 2:
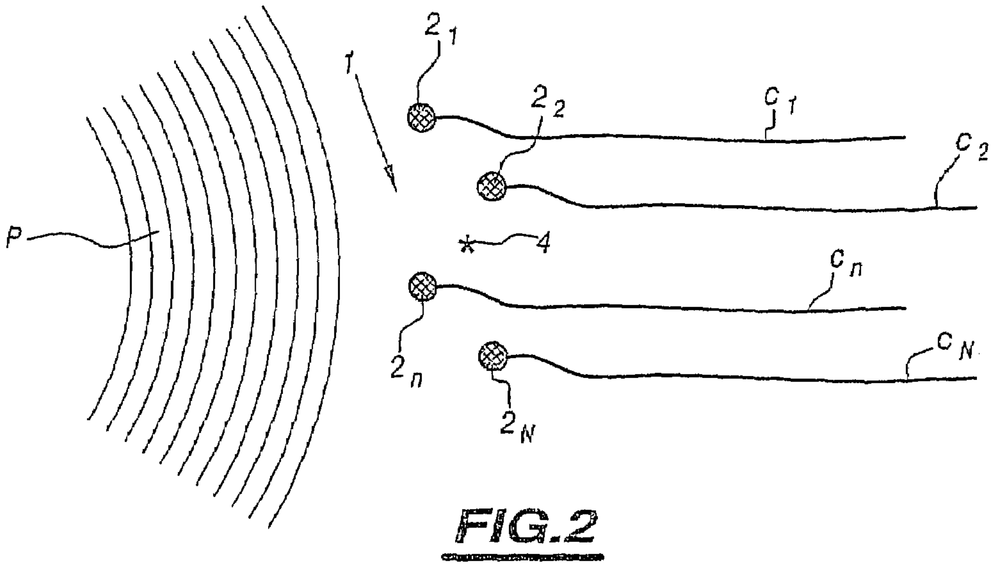
FIG. 2 is a diagram illustrating the acquisition means used.

FIG. 2 illustrates schematically acquisition means 1 comprising N elementary sensors $\mathbf{2}_1$ to $\mathbf{2}_N$.

These elementary sensors are arranged at specific points in space around a predetermined point 4, designated as the centre of the acquisition means 1.

The position of each elementary sensor may thus be expressed in space, in a spherical reference figure such as that described with reference to FIG. 1, centred on the centre 4 of the acquisition means 1.

When exposed to an acoustic field P each sensor $\mathbf{2}_n$ of the acquisition means 1 issues a measurement signal $c_n$, which corresponds to the measurement made by the sensor in the acoustic field P.

The acquisition means 1 thus issue a plurality of signals $c_1$ to $c_N$, which are the signals of the measurement of the acoustic field P by the acquisition means 1.

These measurement signals $c_1$ to $c_N$ issued by the acquisition means 1 are thus directly related to the acquisition capacities of the elementary sensors $\mathbf{2}_1$ to $\mathbf{2}_N$.

Figure 3:
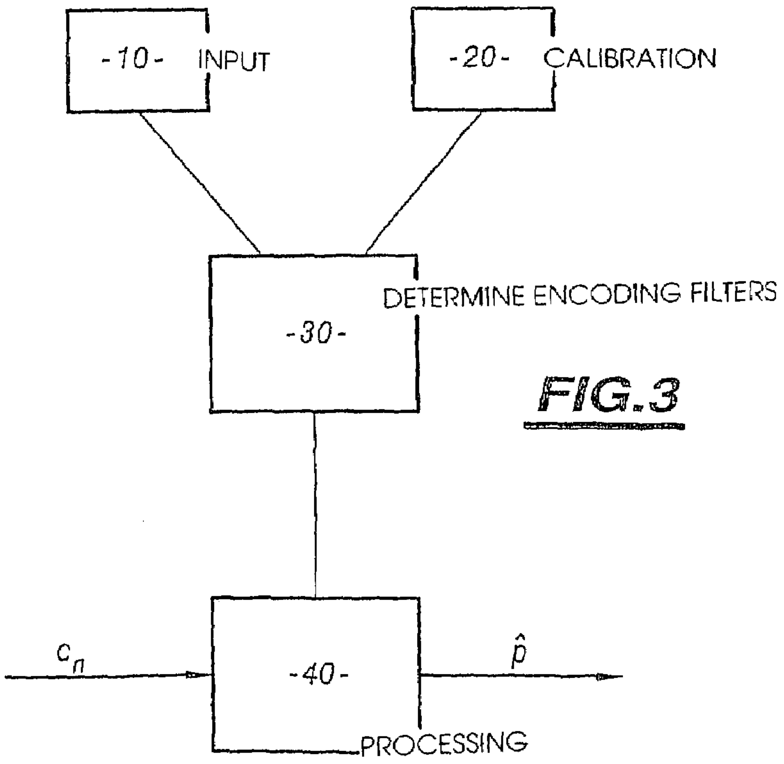
FIG. 3 is a general flow chart of the method of the invention.

FIG. 3 illustrates a general flow chart of the method of the invention.

The method starts with a step 10 involving the inputting of parameters and a step 20 involving the calibration of the acquisition means, which allow a set of parameters that are representative of the structural and/or electro-acoustic characteristics of the acquisition means 1 to be defined.

Some parameters, in particular parameters that are representative of electro-acoustic characteristics, are frequency-dependent.

The inputting step 10 and the calibration step 20, which will be described in greater detail with reference to FIG. 4, may be carried out simultaneously or in any order.

Equally, the method of the invention may comprise only the inputting step 10.

The inputting step 10 and the calibration step 20 allow all or some of the following parameters to be determined for one or more sensor:

- parameters $\vec{x}_n$ that are representative of the position of the sensor $\mathbf{2}_n$ relative to the centre 4 of the acquisition means 1, which are written in spherical coordinates $(r_n, \theta_n, \phi_n)$;
- parameters $d_n(f)$ that are representative of the directivity diagram of the sensor $\mathbf{2}_n$, which may take any values between 0 and 1 and allows the directivity of the sensor $\mathbf{2}_n$ to be described by a combination of omnidirectional and bi-directional diagrams:

if $d_n(f)=0$, the sensor is omnidirectional
if $d_n(f)=\frac{1}{2}$, the sensor is cardioid
if $d_n(f)=1$, the sensor is bi-directional;

- parameters $\alpha_n(f)$ that are representative of the orientation of the sensor $\mathbf{2}_n$, i.e. its maximum sensitivity direction, which is given by the angle couple $(\theta_n^{\alpha}, \phi_n^{\alpha})(f)$;
- parameters $H_n(f)$ that are representative of the frequency response of the sensor $\mathbf{2}_n$, corresponding, for each frequency f, to the sensitivity of the sensor $\mathbf{2}_n$ in the direction $\alpha_n f$);
- parameters $\sigma^2_n(f)$ that are representative of the power spectral density of the background noise of the sensor $\mathbf{2}_n$;
- parameters $B_{n,l,m}(f)$ that are representative of the acquisition capacities of the sensor $\mathbf{2}_n$, i.e. of the manner in which the sensor $\mathbf{2}_n$ gathers information on the acoustic field P. Each $B_{n,l,m}(f)$ is thus representative of the acquisition capacities of a sensor and, in particular, of its position in space, and the total of $B_{n,l,m}(f)$ is representative of the sampling of the acoustic field P carried out by the acquisition means 1;
- a parameter $\mu(f)$ specifying a compromise between faithfulness of representation of the acoustic field P and minimisation of the background noise produced by the sensors $\mathbf{2}_1$ to $\mathbf{2}_N$, and being able to take all values between 0 and 1:
  - if $\mu(f)=0$, the background noise is minimal;
  - if $\mu(f)=1$, the spatial quality is maximal;
- a parameter L(f) specifying the order in which the representation is conducted; and
- a parameter $\{(l_k, m_k)\}(f)$ that is representative of a list of coefficients, the power of which must be equal to the power of the corresponding coefficient in the acoustic field to be represented.

In simplified embodiments, all or some of the described parameters are considered to be frequency-independent.

The parameters $\mu(f)$, L(f) and $\{(l_k, m_k)\}(f)$ are representative of optimisation strategies allowing optimal extraction of spatio-temporal information on the acoustic field P from measurement signals $c_1$ to $c_N$, and are inputted during the inputting step 10. The other parameters may be input during the inputting step 10 or determined during the calibration step 20.

In simplified embodiments, the method of the invention is carried out only with the parameters $\mu(f)$, L(f) and all of the parameters $\vec{x}_n$, or all of the parameters $B_{n,l,m}(f)$ or a combination of parameters $\vec{x}_n$ and $B_{n,l,m}(f)$, so that there is at least one parameter per elementary sensor $\mathbf{2}_n$.

Of course, all or some of the parameters used may be issued by memories or dedicated devices, it being possible for an operator to equate these processes to the direct inputting step 10, as described.

Following the input step 10 and/or the calibration step 20, the method comprises a step 30 involving the determination of encoding filters that are representative of at least the structural characteristics, and advantageously the electro-acoustic characteristics, of the acquisition means 1.

This step 30, which will be described in greater detail with reference to FIG. 5, allows all the parameters determined during the input step 10 and/or the calibration step 20 to be taken into account.

These encoding filters are therefore representative of at least the position characteristics of the elementary sensors $\mathbf{2}_n$ relative to the reference point 4 of the acquisition means 1.

Advantageously, these filters are also representative of other structural characteristics of the acquisition means 1, such as the orientation or mutual influences of the elementary sensors $\mathbf{2}_1$ to $\mathbf{2}_N$, and also their electro-acoustic acquisition capacities and, in particular, their background noise, their directivity diagram, their frequency response, etc.

The encoding filters obtained at the end of the step 30 may be stored, so that the steps 10, 20 and 30 are only repeated in the event of modification of the acquisition means 1 or optimisation strategies.

These encoding filters are applied during a step 40 involving the processing of signals $c_1$ to $c_N$ derived from the elementary sensors $\mathbf{2}_1$ to $\mathbf{2}_N$.

The processing entails filtering the signals and combining the filtered signals.

Following this step 40 involving the processing of the measurement signals by applying encoding filters thereto, a finite number of coefficients representatives over time and in the three-dimensional space of the acoustic field P is issued.

These coefficients are what are known as Fourier-Bessel coefficients, marked $P_{l,m}(f)$ and correspond to a representation of the acoustic field P that is substantially independent of the characteristics of the acquisition means 1.

It would therefore appear that the method of the invention allows a faithful representation of the acoustic field of which the temporal and spatial characteristics are being transcribed, whatever acquisition means are used.

Figure 4:
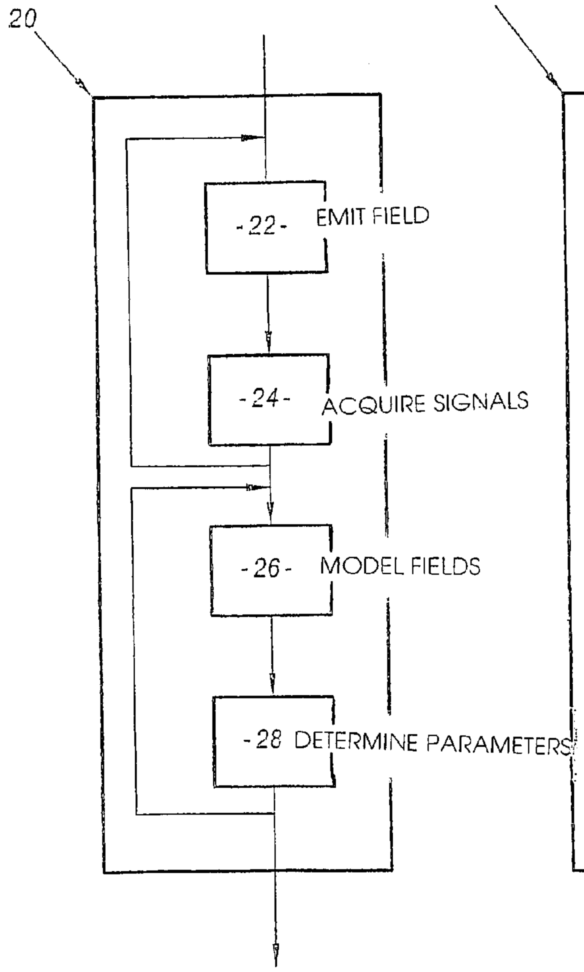
FIG. 4 is a detailed flow chart of an embodiment of the calibration step of the method of the invention.

FIG. 4 illustrates a flow chart of an embodiment of the calibration step 20.

In this embodiment, the calibration step 20 allows the coefficients $B_{n,l,m}(f)$ which are representative of the acquisition capacities of the acquisition means 1, to be determined directly.

This step 20 starts with a sub-step 22 involving the emission of a specific acoustic field toward the acquisition means 1, and with a sub-step 24 involving the acquisition of measurement signals by the acquisition means 1 exposed to the emitted acoustic field.

Theses sub-steps 22 and 24 are repeated for a plurality Q of specific different fields, and require means for generating specific acoustic fields and means for displacing and/or rotating the acquisition means 1.

For example, the calibration step 20 is carried out using means for generating an acoustic field that merely comprise a fixed loudspeaker, which is assumed to be a point loudspeaker having a flat frequency response, the loudspeaker and the acquisition mans 1 being placed in an anechoic environment.

In each generating sub-step 22, the loudspeaker emits the same acoustic field and the acquisition means 1 are placed in the same position, but they are oriented in different and known directions.

It is, of course, also possible to displace the loudspeaker.

Therefore, in the reference figure of the acquisition means 1, the loudspeaker is in a different position $(r_q^{hp},\theta_q^{hp},\phi_q^{hp})$ for each field q generated.

The acquisition means 1 are thus exposed to an acoustic field q, the Fourier-Bessel coefficients of which $P_{l,m,q}(f)$, in the reference figure of the acquisition means 1, are known up to a given order, marked $L_3$.

In the described embodiment, the measurement signals issued following the acquisition sub-step 24 are a finite number of coefficients that are representative of the generated acoustic field q, as well as of the acquisition capacities of the acquisition means 1.

The parameters $L_3$ and Q are selected so as to respect the condition: $Q \geqq (L_3+1)^2$ Advantageously, the method subsequently comprises a modelling sub-step 26, allowing a representation of the Q acoustic fields emitted during the sub-step 22 to be determined.

A modelling matrix P that is representative of all of the known fields Q to which the acquisition means 1 are exposed in succession, is thus determined during the sub-step 26. This matrix P is a matrix of the size $(L_3+1)^2$ over Q, comprising elements $P_{l,m,q}(f)$, the indices (l,m) designating the row $(l^2+l+m)$, and the index q designating the column q. The matrix P therefore has the following form:

$$\begin{bmatrix} P_{0,0,1}(f) & P_{0,0,2}(f) & \cdots & P_{0,0,Q}(f) \\ P_{1,-1,1}(f) & P_{1,-1,2}(f) & \cdots & P_{1,-1,Q}(f) \\ P_{1,0,1}(f) & P_{1,0,2}(f) & \cdots & P_{1,0,Q}(f) \\ P_{1,1,1}(f) & P_{1,1,2}(f) & \cdots & P_{1,1,Q}(f) \\ \vdots & \vdots & & \vdots \\ P_{L_3,-L_3,1}(f) & P_{L_3,-L_3,2}(f) & \cdots & P_{L_3,-L_3,Q}(f) \\ \vdots & \vdots & & \vdots \\ P_{L_3,0,1}(f) & P_{L_3,0,2}(f) & \cdots & P_{L_3,0,Q}(f) \\ \vdots & \vdots & & \vdots \\ P_{L_3,L_3,1}(f) & P_{L_3,L_3,2}(f) & \cdots & P_{L_3,L_3,Q}(f) \end{bmatrix}$$

In the described embodiment, the acoustic field produced by the loudspeaker is modelled by spherical radiation, such that, in the reference figure of the acquisition means 1, the coefficients $P_{l,m,q}(f)$ of each acoustic field q thus generated are known, owing to the relationship:

$$P_{l,m,q}(f) = \frac{1}{r_q^{hp}} e^{-\frac{j2\pi r_q^{hp} f}{c}} \xi_l(r_q^{hp}, f) y_l^m(\theta_q^{hp}, \phi_q^{hp})$$

wherein $$\xi_l(r_q^{hp}, f) = \sum_{k=0}^{l} \frac{(l+k)!}{2^k k!(l-k)!} \left( \frac{j2\pi r_q^{hp} f}{c} \right)^{-k}$$

The coefficients obtained in the sub-step 26 are then used in a sub-step 28, in order to determine parameters that are representative of structural and/or sound characteristics of the acquisition means 1.

In the described embodiment, this sub-step 28 also uses the modelling matrix P determined in the sub-step 26.

This sub-step 28 starts with the determination of a matrix C that is representative of all of the signals $c_{n,q}(t)$ picked up at the output of N sensors in response to Q known fields. This matrix C is a matrix of size N over Q, comprising elements $C_{n,q}(f)$, the index n designating the row n, and the index q designating the column q. The elements $C_{n,q}(f)$ are deduced from the signals $c_{n,q}(t)$ by Fourier transformation. The matrix C therefore has the following form:

$$\begin{bmatrix} C_{1,1}(f) & C_{1,1}(f) & \cdots & C_{1,1}(f) \\ C_{2,1}(f) & C_{2,2}(f) & \cdots & C_{2,Q}(f) \\ \vdots & \vdots & & \vdots \\ C_{N,1}(f) & C_{N,2}(f) & \cdots & C_{N,Q}(f) \end{bmatrix}$$

The matrix C is representative of the acquisition capacities of the acquisition means 1 and the Q emitted acoustic fields.

In the described embodiment, the coefficients $B_{n,l,m}(f)$ are determined from the matrices C and B, during the sub-step 28, using conventional methods of general matrix inversion, applied to the relationship that links C to P. For example, the coefficients $B_{n,l,m}(f)$ are placed in a matrix B that is determined by the following relationship:

$$B = C\,P^T(P\,P^T)^{-1}$$

B is a matrix of size N over $(L_3+1)^2$ comprising coefficients $B_{n,l,m}(f)$, the index n designating the row n and the indices (l,m) designating the column $l^2+l+m$. The matrix B therefore has the following form:

$$\begin{bmatrix} B_{1,0,0}(f) & B_{1,1,-1}(f) & B_{1,1,0}(f) & B_{1,1,1}(f) & \ldots & B_{1,L_3,-L_3}(f) & \ldots & B_{1,L_3,0}(f) & \ldots & B_{1,L_3,L_3}(f) \\ B_{2,0,0}(f) & B_{2,1,-1}(f) & B_{2,1,0}(f) & B_{2,1,1}(f) & \ldots & B_{2,L_3,-L_3}(f) & \ldots & B_{2,L_3,0}(f) & \ldots & B_{2,L_3,L_3}(f) \\ \vdots & \vdots & \vdots & \vdots & & \vdots & & \vdots & & \vdots \\ B_{N,0,0}(f) & B_{N,1,-1}(f) & B_{N,1,0}(f) & B_{N,1,1}(f) & \ldots & B_{N,L_3,-L_3}(f) & \ldots & B_{N,L_3,0}(f) & \ldots & B_{N,L_3,L_3}(f) \end{bmatrix}$$

These sub-steps 26 and 28 are carried out for each operating frequency, and the coefficients thus determined directly form the parameters that are representative of the acquisition capacities of the acquisition means 1.

The sub-steps 26 and 28 of the calibration step 20 may be carried out in various ways, as a function of the parameters that have to be determined.

For example, in the case where the calibration step 20 allows the position $\vec{x}_N$ of each sensor $\mathbf{2}_n$ to be determined, the sub-steps 26 and 28 use the propagation times of the waves emitted by the loudspeakers to reach the sensors $\mathbf{2}_n$. The position of each sensor $\mathbf{2}_n$ is determined using at least three propagation time measurements, according to triangulation methods.

In another case, when the loudspeaker emits a given impulse, the sub-steps 26 and 28 allow the impulse responses of each sensor $\mathbf{2}_n$ to be determined from the signals $c_{n,q}(t)$.

Standard methods for determining impulse responses, such as MLS (maximum length sequence), for example, are used in this case.

Advantageously, the calibration step 20 allows electro-acoustic characteristics of the sensors to be determined. It then starts by determining the directivity diagram of each sensor $\mathbf{2}_n$ for each given frequency f, for example, by determining the frequency response of each sensor $\mathbf{2}_n$ for a plurality of directions.

In a second stage, all or some of the following parameters are determined:

parameters $\alpha_n(f)$ that are representative of the orientation of each sensor $\mathbf{2}_n$, i.e. of its maximum sensitivity direction, given by the angles $(\theta_n^\alpha, \phi_n^\alpha)(f)$, for which the directivity diagram admits a maximum to the common frequency f;

parameters $H_n(f)$ that are representative of the frequency response of each sensor $\mathbf{2}_n$ in the maximum sensitivity direction, which thus corresponds to the value of the directivity diagram for the direction $(\theta_n^\alpha, \phi_n^\alpha)(f)$; and parameters $d_n(f)$ that are representative of the directivity diagram of each sensor, which allows the directivity of each sensor to be described by a model comprising a combination of omnidirectional and bi-directional diagrams oriented in the direction $\alpha_n(f)$, using the following directivity model:

$$1-d_n(f)+d_n(f)\cos(\alpha_n(f).(\theta, \phi))$$

wherein $\alpha_n(f).(\theta, \phi)$ designates the scalar product between the directions $\alpha_n(f)$ and $(\theta, \phi)$.

This parameter $d_n(f)$ may be determined using standard methods for estimating parameters, for example by applying a method of least squares that provides the value $d_n(f)$, which minimises the error between the real directivity diagram and the modelled directivity diagram.

Advantageously, the calibration step 20 also allows the parameter $\sigma^2_n(f)$ which corresponds to the power spectral density of the background noise of the sensors, to be determined. The signal issued by the sensor $\mathbf{2}_n$ is thus picked up during this step 20, in the absence of an acoustic field. The parameter $\sigma^2_n(f)$ is determined using methods for estimating power spectral density, such as the so-called periodogram method, for example.

Depending on the embodiments, all or some of sub-steps 22 to 28 are repeated, in order, for example, to allow a plurality of types of parameters to be determined, wherein some sub-steps may be common to the determination of various types of parameters.

The calibration step 20 may also be carried out using means other than those described, such as direct measuring means—for example, using means for optically measuring the position of each elementary sensor $\mathbf{2}_n$ relative to the centre 4 of the acquisition means 1.

Furthermore, the calibration step 20 may carry out a simulation, using a computer, for example, of signals that are representative of the acquisition capacities of the elementary sensors $\mathbf{2}_n$.

It would therefore appear that this calibration step 20 allows all or some of the parameters that are representative of the structural and/or electro-acoustic characteristics of the acquisition means 1, which are used during the step 30 involving the determination of the encoding filters, to be determined.

Figure 5:
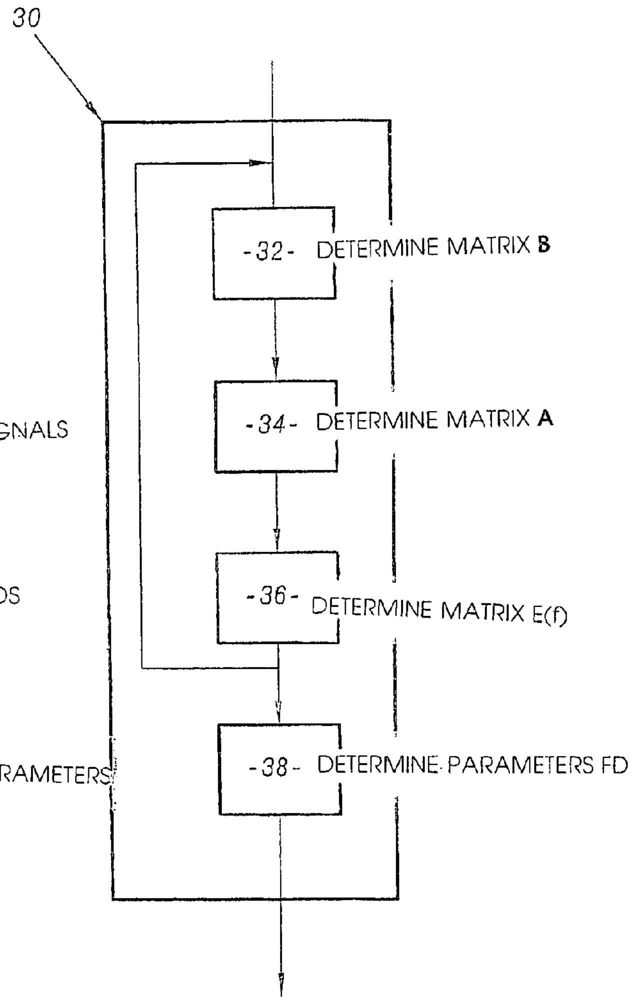
FIG. 5 is a detailed flow chart of an embodiment of the step involving the determination of the encoding filters of the method of the invention.

FIG. 5 illustrates a flow chart of an embodiment of the step 30 involving the determination of the encoding filters.

The step 30 comprises a sub-step 32 that involves the determination of a matrix B that is representative of the acquisition capacities of the acquisition means 1 or sampling matrix.

In the described embodiment, the matrix B is determined from the parameters $\vec{x}_n$, $H_n(f)$, $d_n(f)$, $\alpha_n(f)$ and $B_{n,l,m}(f)$ and is a matrix of size N over $(L(f)+1)^2$, comprising elements $B_{n,l,m}(f)$, the index n designating the row n, and the indices (l,m) designating the column $l^2+l+m$. The matrix B therefore has the following form:

$$\begin{bmatrix} B_{1,0,0}(f) & B_{1,1,-1}(f) & B_{1,1,0}(f) & B_{1,1,1}(f) & \dots & B_{1,L,-L}(f) & \dots & B_{1,L,0}(f) & \dots & B_{1,L,L}(f) \\ B_{2,0,0}(f) & B_{2,1,-1}(f) & B_{2,1,0}(f) & B_{2,1,1}(f) & \dots & B_{2,L,-L}(f) & \dots & B_{2,L,0}(f) & \dots & B_{2,L,L}(f) \\ \vdots & \vdots & \vdots & \vdots & & \vdots & & \vdots & & \vdots \\ B_{N,0,0}(f) & B_{N,1,-1}(f) & B_{N,1,0}(f) & B_{N,1,1}(f) & \dots & B_{N,L,-L}(f) & \dots & B_{N,L,0}(f) & \dots & B_{N,L,L}(f) \end{bmatrix}$$

Specific elements of the matrix B may be determined directly during steps 10 or 20. The matrix B is then supplemented with elements determined from a modelling of the sensors.

In this embodiment, each sensor n is modelled by a point sensor placed in the position $\vec{x}_n$, exhibiting a directivity composed of a combination of omnidirectional and bi-directional diagrams of proportion $d_n(f)$, oriented in the direction $\alpha_n(f)$ and having a frequency response $H_n(f)$.

The complementary elements $B_{n,l,m}(f)$ are then determined according to the relationship:

$$B_{n,l,m}(f) = 4\pi H_n(f) j^l \times \{(1-d_n(f)) j_l(kr_n) y_l^m(\theta_n, \phi_n) - j d_n(f) \times \left( j_l^*(kr_n) y_l^m(\theta_n, \phi_n) u_r - \frac{j_l(kr_n)}{kr_n} R_l^{|m|}(\cos\theta_n) trg_m(\phi) u_\theta + \frac{m j_l(kr_n)}{kr_n \sin\theta_n} y_l^{-m}(\theta_n, \phi_n) u_\theta \right)\} \text{ wherein}$$

$$j_l^*(kr_n) = \frac{l j_{l-1}(kr_n) - (l+1) j_{l+1}(kr_n)}{2l+1}$$

-continued $$
R_l^m(\cos\theta_n) = \begin{cases} \sqrt{l(l+1)}\, P_l^1(\cos\theta_n) & \text{when } m = 0 \\ \sqrt{\frac{(l-m)(l+m+1)}{2}}\, P_l^{m+1}(\cos\theta_n) - & \text{when } 1 \le m \le l-1 \\ \sqrt{\frac{(l+m)(l-m+1)}{2}}\, P_l^{m-1}(\cos\theta_n) - & \\ \sqrt{\frac{l}{2}}\, P_l^{l-1}(\cos\theta_n) & \text{when } m = 1 \end{cases}
$$

and wherein $$u_r = \sin\theta_n \sin\theta_n^\alpha(f)\cos(\phi_n - \phi_n^\alpha(f)) + \cos\theta_n \cos\theta_n^\alpha(f)$$

$$u_\theta = \cos\theta_n \sin\theta_n^\alpha(f)\cos(\phi_n - \phi_n^\alpha(f)) - \sin\theta_n \cos\theta_n^\alpha(f)$$

$$u_\phi = \sin\theta_n^\alpha(f)\sin(\phi_n^\alpha(f) - \phi_n)$$

In the event of the sensors being oriented radially, the relationship admits a simpler expression:

$$
B_{n,l,m}(f) = 4\pi H_n(f) j^l y_l^m(\theta_n, \phi_n) \left( (1 - d_n(f)) j_l(kr_n) - j d_n(f) \frac{l j_{l-1}(kr_n) - (l+1) j_{l+1}(kr_n)}{2l+1} \right)
$$

The step 30 then comprises a sub-step 34 involving the determination of an intercorrelation matrix A that is representative of the similarity between the signals $c_1$ to $c_N$ issued by the sensors $\mathbf{2}_1$ to $\mathbf{2}_N$, owing to the fact that these sensors $\mathbf{2}_1$ to $\mathbf{2}_N$ carry out measurements on a single acoustic field P. The matrix A is determined from the sampling matrix B. A is a matrix of size N over N, obtained by means of the relationship:

$$A = B\, B^T$$

Advantageously, the matrix A is determined more precisely using a matrix B that is supplemented up to an order $L_2$, according to the method of the preceding step.

Since the matrix A may be expressed solely as a function of the matrix B, the sub-step 34 involving the determination of the intercorrelation matrix A may be considered as an intermediate calculation step, and may thus be incorporated into another sub-step of the step 30.

The step 30 then comprises a sub-step 36 involving the determination of an encoding matrix E(f) that is representative of the encoding filters for a given frequency. The matrix E(f) is determined from the matrices A and B and from the parameters L(f), H(f), $\{(l_k, m_k)\}(f)$ and $\sigma_n^2(f)$. The matrix E(f) is a matrix of size $(L(f)+1)^2$ over N, comprising elements $E_{l,m,n}(f)$, the indices (l,m) designating the row $l^2+l+m$, and the index n designating the column n. The matrix E(f) therefore has the following form:

$$
\begin{bmatrix} E_{0,0,1}(f) & E_{0,0,2}(f) & \dots & E_{0,0,N}(f) \\ E_{1,-1,1}(f) & E_{1,-1,2}(f) & \dots & E_{1,-1,N}(f) \\ E_{1,0,1}(f) & E_{1,0,2}(f) & \dots & E_{1,0,N}(f) \\ E_{1,1,1}(f) & E_{1,1,2}(f) & \dots & E_{1,1,N}(f) \\ \vdots & \vdots & & \vdots \\ E_{L,-L,1}(f) & E_{L,-L,2}(f) & \dots & E_{L,-L,N}(f) \\ \vdots & \vdots & & \vdots \\ E_{L,0,1}(f) & E_{L,0,2}(f) & \dots & E_{L,0,N}(f) \\ \vdots & \vdots & & \vdots \\ E_{L,L,1}(f) & E_{L,L,2}(f) & \dots & E_{L,L,N}(f) \end{bmatrix}
$$

The matrix E(f) is determined row by row. For each operating frequency f, each row $E_{l,m}$ of index (l,m) of the matrix E(f) assumes the following form:

$$[E_{l,m,1}(f) E_{l,m,2}(f) \dots E_{l,m,N}(f)]$$

The elements $E_{l,m,n}(f)$ of the row $E_{l,m}$ are obtained by the following expressions:

if (l,m) belongs to the list $\{(l_k, m_k)\}(f)$, then:

$$E_{l,m} + \mu(f) B_{l,m}^T((\mu(f) - \lambda)A + (1 - \mu(f)\Sigma_N)^{-1}$$

wherein λ confirms the relationship:

$$(\mu(f))^2 B_{l,m}^T((\mu(f) - \lambda)A + (1 - \mu(f))\Sigma_N)^{-1} A(\mu(f) - \lambda)A + (1 - \mu(f))\Sigma_N)^{-1} B_{l,m} = 1$$

and wherein the value of λ is determined using analytical or numerical methods for investigating equation roots, optionally using methods of matrix diagonalisation; and if (l,m) does not belong to the list $\{(l_k, m_k)\}(f)$, then:

$$E_{l,m} = \mu(f) B_{l,m}^T((\mu(f)A + (1 - \mu(f))\Sigma_N)^{-1}$$

In these expressions, $B_{l,m}$ is the column (l,m) of the matrix B and $\Sigma_N$ is a diagonal matrix of size N over N, which is representative of the background noise of the sensors, wherein the element n of the diagonal is $\sigma_n^2(f)$.

The sub-steps 32, 34 and 36 involving the determination of the matrices A, B and E(f) are repeated for each operating frequency f.

Of course, in simplified embodiments, the parameters are frequency-independent, and the sub-steps 32, 34 and 36 are only carried out once. The sub-step 36 then allows directly the determination of a frequency-independent matrix E.

During a subsequent sub-step 38, parameters FD that are representative of the encoding filters are determined from the matrix E(f). Each element $E_{l,m,n}(f)$ of the matrix E(f) represents the frequency response of an encoding filter. Each encoding filter may be described by the parameters FD, in different forms.

If, for example, the parameters FD that are representative of the filters $E_{l,m,n}(f)$ are:

- frequency responses, the parameters FD are then directly the $E_{l,m,n}(f)$ calculated for specific frequencies f;
- finite impulse responses $c_{l,m,n}(t)$ calculated by inverse Fourier transformation of $E_{l,m,n}(f)$, each impulse response $c_{l,m,n}(t)$ is sampled, then truncated to a suitable length for each response; and recursive filter coefficients with infinite impulse responses calculated from $E_{l,m,n}(f)$ using adaptation methods.

The step 30 involving the determination of the encoding filters thus issues parameters FD describing encoding filters that are representative of at least the structural and/or elctro-acoustic capacities of the acquisition means 1.

In particular, these filters are representative of the following characteristics:

position of the sensors $\mathbf{2}_1$ to $\mathbf{2}_N$;

intrinsic electro-acoustic characteristics of the sensors $\mathbf{2}_1$ to $\mathbf{2}_N$, in particular power spectral density of the background noise and acquisition capacities of the acoustic field; and optimisation strategies, in particular the compromise between spatial faithfulness of acquisition of the acoustic field and minimisation of the background noise produced by the sensors.

Figure 6:
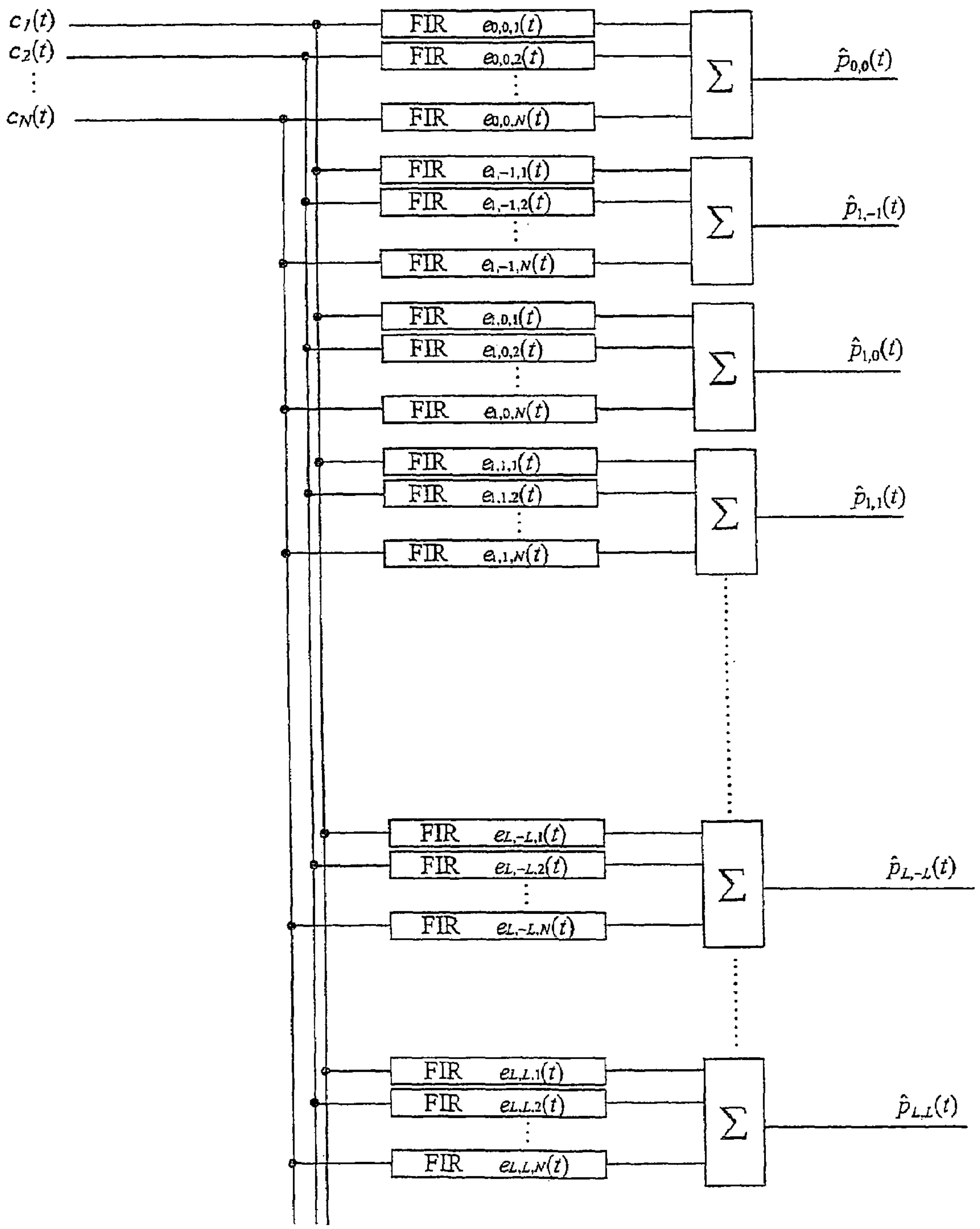
FIG. 6 is a detailed diagram of an embodiment of the step involving the application of the encoding filters.

FIG. 6 illustrates in detail an embodiment of the step 40 involving the processing of the measurement signals issued by the acquisition means 1, by applying encoding filters to these signals and by adding the filtered signals.

In the step 40, the coefficients $\hat{p}_{l,m}(t)$ that are representative of the acoustic field P are deduced from the signals $c_1$ to $c_N$ derived from the elementary sensors $\mathbf{2}_1$ to $\mathbf{2}_N$, by applying the frequency-response encoding filters $E_{l,m,n}(f)$ in the following manner:

$$\hat{P}_{l,m}(f)=\sum_{n=1}^{N}E_{l,m,n}(f)C_n(f)$$

wherein $\hat{P}_{l,m}(f)$ is the Fourier transform of $\hat{p}_{l,m}(t)$ and $C_n(f)$ is the Fourier transform of $c_n(t)$.

The example described the case of filtering by finite impulse response. This filtering requires the determination, initially, of a parameter $T_{n,l,m}$, corresponding to the suitable number of samples for each response $e_{n,l,m}(t)$, which results in the following convolution expression:

$$\hat{P}_{l,m}[t]=\sum_{n=1}^{N}\sum_{\tau=0}^{T_{n,l,m}-1}e_{n,l,m}[\tau]c_n[t-\tau]$$

These coefficients $\hat{p}_{l,m}$ are a finite number of coefficients that are representative over time and in the three-dimensional space of the acoustic field, and form a faithful representation of this acoustic field.

Depending on the nature of the parameters FD, other filtering processes by $E_{l,m,n}(f)$ may be carried out according to various filtering methods, such as, for example:

if the parameters FD provide the frequency responses $E_{l,m,n}(f)$ directly, the filtering is carried out using filtering methods in the frequency domain, such as block convolution processes, for example;

if the parameters FD provide the finite impulse response $c_{l,m,n}(t)$, the filtering is carried out in the time domain by convolution; and if the parameters FD provide the coefficients of a recursive filter with infinite impulse response, the filtering is carried out in the time domain by means of the recurrence relation.

It would therefore appear that the invention allows an acoustic field to be represented faithfully, by means of a representation that is substantially independent of the characteristics of the acquisition means, in the form of Fourier-Bessel coefficients.

Moreover, as previously stated, the method of the invention may be carried out in simplified embodiments.

If, for example, all of the sensors $\mathbf{2}_1$ to $\mathbf{2}_N$ are substantially omnidirectional and substantially identical in terms of sensitivity and level of background noise, the method of the invention may be carried out solely on the basis of knowledge of the parameters $\vec{x}_n$ that are representative of the position of the sensors $\mathbf{2}_n$ relative to the centre 4 of the acquisition means 1, and of the parameters μ and L, which relate to the optimisation strategy.

Moreover, in this simplified embodiment, the parameters are considered to be frequency-independent.

Using these parameters, the matrices A and B are thus calculated simultaneously or sequentially in any order during the sub-steps 32 and 34.

The elements $B_{n,l,m}(f)$ of the matrix B are then organised in the following manner:

$$\begin{bmatrix} B_{1,0,0}(f) & B_{1,1,-1}(f) & B_{1,1,0}(f) & B_{1,1,1}(f) & \dots & B_{1,L,-L}(f) & \dots & B_{1,L,0}(f) & \dots & B_{1,L,L}(f) \\ B_{2,0,0}(f) & B_{2,1,-1}(f) & B_{2,1,0}(f) & B_{2,1,1}(f) & \dots & B_{2,L,-L}(f) & \dots & B_{2,L,0}(f) & \dots & B_{2,L,L}(f) \\ \vdots & \vdots & \vdots & \vdots & & \vdots & & \vdots & & \vdots \\ B_{N,0,0}(f) & B_{N,1,-1}(f) & B_{N,1,0}(f) & B_{N,1,1}(f) & \dots & B_{N,L,-L}(f) & \dots & B_{N,L,0}(f) & \dots & B_{N,L,L}(f) \end{bmatrix}$$

wherein $$B_{n,l,m}(f)=4\pi j^l j_l(kr_n)y_l^m(\theta_n,\phi_n)$$

Similarly, the elements $A_{n1,n2}(f)$ of the matrix A are then organised in the following manner:

$$\begin{bmatrix} A_{1,1}(f) & A_{1,2}(f) & \dots & A_{1,N}(f) \\ A_{2,1}(f) & A_{2,2}(f) & \dots & A_{2,N}(f) \\ \vdots & \vdots & & \vdots \\ A_{N,1}(f) & A_{N,2}(f) & \dots & A_{N,N}(f) \end{bmatrix}$$

In this embodiment, the matrix A is obtained from the matrix B by means of the relationship:

$$A=B\,B^T$$

Advantageously, the elements $A_{n1,n2}(f)$ of the matrix A are determined with greater precision by means of the relationship:

$$A_{n_1,n_2}(f) = 4\pi\sum_{l=0}^{L_2}(2l+1)j_l(kr_{n_1})j_l(kr_{n_2})$$
$$P_l(\cos\theta_{n_1}\cos\theta_{n_2} + \sin\theta_{n_1}\sin\theta_{n_2}\cos(\phi_{n_1}-\phi_{n_2}))$$

wherein $L_2$ is the order in which the determination of the matrix A is conducted and is an integer greater than L. The greater the value selected for $L_2$, the more precise, but longer, the calculation of the $A_{n1,n2}(f)$ will be.

In the sub-step 36, the encoding matrix E which is representative of the encoding filters, is determined from the matrices A and B and the parameter μ according to the expression:

$$E=\mu B^T(\mu A+(1-\mu)I_N)^{-1}$$

The elements $E_{l,m,n}(f)$ of the matrix E are organised in the following manner:

$$\begin{bmatrix} E_{0,0,1}(f) & E_{0,0,2}(f) & \cdots & E_{0,0,N}(f) \\ E_{1,-1,1}(f) & E_{1,-1,2}(f) & \cdots & E_{1,-1,N}(f) \\ E_{1,0,1}(f) & E_{1,0,2}(f) & \cdots & E_{1,0,N}(f) \\ E_{1,1,1}(f) & E_{1,1,2}(f) & \cdots & E_{1,1,N}(f) \\ \vdots & \vdots & & \vdots \\ E_{L,-L,1}(f) & E_{L,-L,2}(f) & \cdots & E_{L,-L,N}(f) \\ \vdots & \vdots & & \vdots \\ E_{L,0,1}(f) & E_{L,0,2}(f) & \cdots & E_{L,0,N}(f) \\ \vdots & \vdots & & \vdots \\ E_{L,L,1}(f) & E_{L,L,2}(f) & \cdots & E_{L,L,N}(f) \end{bmatrix}$$

The sub-steps 32, 34 and 36 involving the determination of the matrices A and B, then E are repeated for all of the operating frequencies f Each element $E_{l,m,n}(f)$ corresponds to an encoding filter that incorporates the spatial distribution of the sensors $\mathbf{2}_n$ and also the optimisation strategy.

In the phase 40, the signals $c_1$ to $c_N$ derived from the sensors $\mathbf{2}_1$ to $\mathbf{2}_N$ are filtered using encoding filters described by the parameters FD. Each coefficient $\hat{p}_{l,m}(t)$ issued is deduced from signals $c_1$ to $c_N$ by applying filters in the following manner:

$$\hat{P}_{l,m}(f) = \sum_{n=1}^{N} E_{l,m,n}(f)C_n(f)$$

wherein $\hat{P}_{l,m}(f)$ is the Fourier transform of $\hat{p}_{l,m}(t)$, and $C_n(f)$ is the Fourier transform of $c_n(t)$.

In this embodiment, the coefficients $\hat{p}_{l,m}(t)$ are determined using filtering methods in the frequency domain, such as block convolution methods, for example.

The representation of the acoustic field therefore takes into consideration the position of the sensors and the selected optimisation parameters and constitutes a faithful estimate of the acoustic field.

Figure 7:
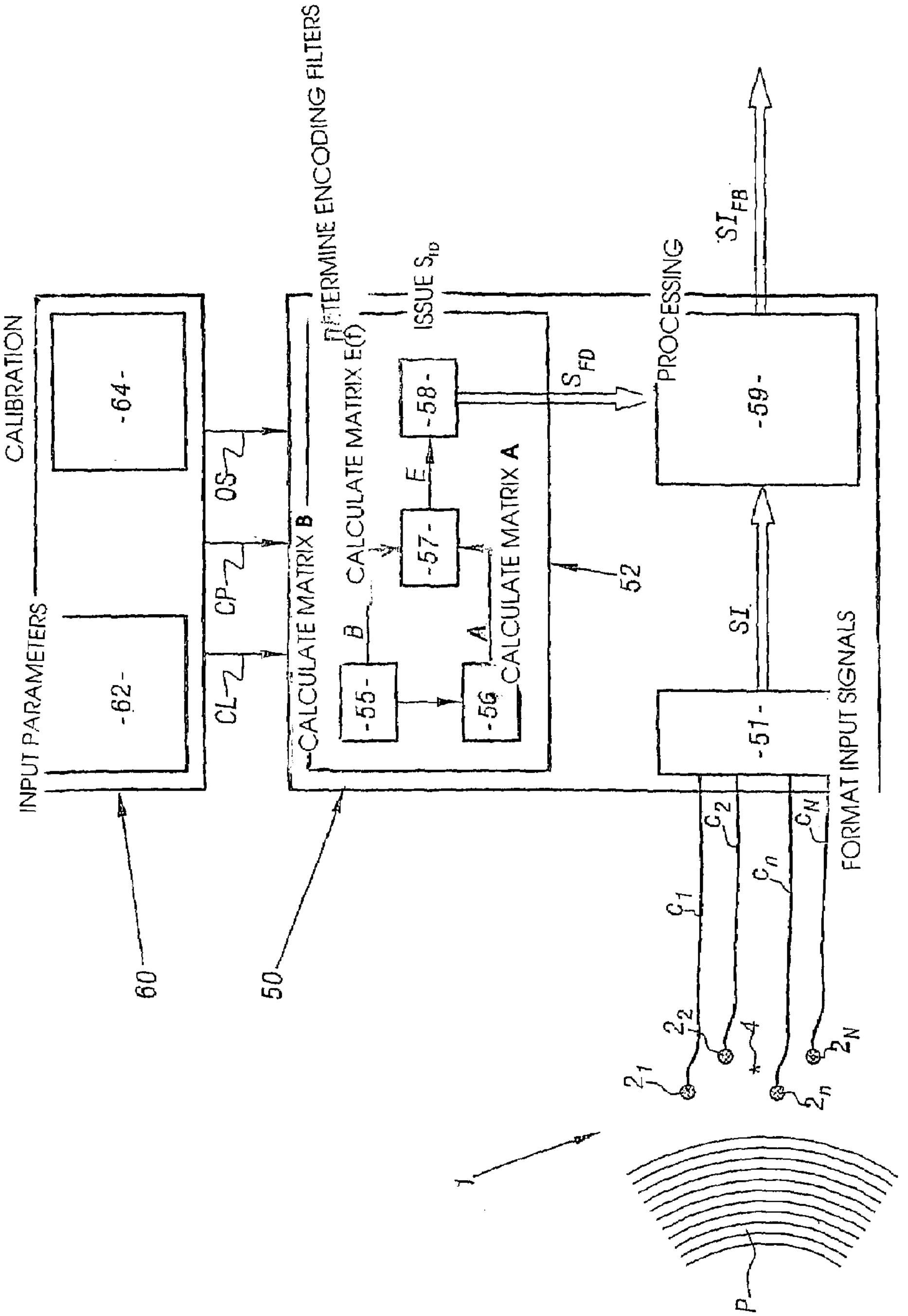
FIG. 7 is a block diagram of a device that is suitable for carrying out the method of the invention.

FIG. 7 is a block diagram of a device that is suitable for carrying out the method of the invention.

In this figure, a device 50 for representing the acoustic field P is connected to the acquisition means 1, as described with reference to FIG. 2.

The device 50, or encoding device, is also connected at the input to means 60 for determining parameters that are representative of the structural and/or electro-acoustic characteristics of the acquisition means 1.

These means 60 comprise, in particular, means 62 for inputting parameters and calibration means 64, which are suitable for carrying out steps 10 and 20, respectively, of the method of the invention, as described above.

The encoding device 50 receives, from means 60 for determining the parameters, a plurality of parameters that are representative of the characteristics of the acquisition means 1 that are distributed between a signal CL for defining the structural characteristics and a signal CP for the parameterisation of the structural and/or electro-acoustic characteristics.

The device also receives parameters relating to representation strategies in a signal OS for optimising representation.

In these signals, the parameters are distributed in the following manner:

in the definition signal CL:
- parameters $\vec{x}_n$ that are representative of the position of the sensor $\mathbf{2}_n$;

in the parameterisation signal CP:
- parameters $H_n(f)$ that are representative of the frequency response of the sensor $\mathbf{2}_n$;
- parameters $d_n(f)$ that are representative of the directivity diagram of the sensor $\mathbf{2}_n$;
- parameters $\alpha_n(f)$ that are representative of the orientation of the sensor $\mathbf{2}_n$;
- parameters $\sigma^2_n(f)$ that are representative of the power spectral density of the background noise of the sensor $\mathbf{2}_n$; and
- parameters $B_{n,l,m}(f)$ that are representative of the acquisition capacities of the sensor $\mathbf{2}_n$; and in the optimisation signal OS:
- a parameter μ(f) specifying the compromise between the faithfulness of representation of the acoustic field and minimisation of the background noise produced by the sensors;
- a parameter L(f) specifying the order in which the representation is conducted; and
- a parameter $\{(l_k,m_k)\}(I)$ that is representative of the list of the coefficients, the power of which must be equal to the power of the corresponding coefficient in the acoustic field to be represented P.

Advantageously, this device 50 comprises means 51 for formatting input signals that are suitable for issuing, from signals $c_1$ to $c_N$, a corresponding formatted signal SI.

For example, the means 51 comprise analogue-digital converters, amplifiers or even filtering systems.

The device 50 further comprises means 52 for determining the encoding filters, which means comprise a module 55 for calculating the sampling matrix B and a module 56 for calculating the intercorrelation matrix A, both of which are connected to a module 57 for calculating the encoding matrix E(f).

This encoding matrix E(f) is used by a module 58 for determining encoding filters that issues a signal $S_{FD}$, which contains the parameters FD that are representative of the encoding filters.

This signal $S_{FD}$ is used by a processing module 59 that applies the encoding filters to the signal SI in order to issue a signal $SI_{FB}$ which comprises the Fourier-Bessel coefficients that are representative of the acoustic field P.

Optionally, the device 50 comprises a non-volatile memory in which the parameters that form the signal $S_{FD}$, which have been determined previously, are stored.

For example, the acquisition means 1 are tested and calibrated by their manufacturer in order to provide directly a memory comprising all of the parameters of the signal $S_{FD}$ that are to be incorporated into an encoding device in order to acquire the acoustic field P and to issue a faithful representation thereof.

Similarly, in a variant, this memory comprises only the matrices B and optionally A, and the device 50 comprises means for inputting the parameters forming the optimisation signal OS, in order to carry out the determination of the encoding matrix E(f) and the determination of the parameters FD that are representative of the encoding filters.

Other distributions between the various modules described may, of course, be envisaged, as required.

The invention claimed is:

1. Method for representing an acoustic field comprising the steps of:

using acquisition means comprising one or more elementary sensors that are exposed to said acoustic field to obtain measurement signals that are measurements of the acoustic field by the acquisition means and that are dependant on characteristics of the acquisition means;

determining encoding filters that are representative of at least the structural characteristics of said acquisition means;

processing said measurement signals by applying said encoding filters to these signals in order to determine a finite number of coefficients representative over time and in the three-dimensional space of said acoustic field, said coefficients being representative of said acoustic field and substantially independent of the characteristics of said acquisition means; and issuing a representation of said acoustic field based on said coefficients.

2. Method according to claim 1, wherein said structural characteristics comprise at least position characteristics of said elementary sensors relative to a predetermined reference point of said acquisition means.

3. Method according to claim 1, wherein said encoding filters are also representative of electro-acoustic characteristics of said acquisition means.

4. Method according to claim 3, wherein, said electro-acoustic characteristics comprise at least characteristics related to intrinsic electro-acoustic acquisition capacities of said elementary sensors.

5. Method according to claim 1, wherein said coefficients are Fourier-Bessel coefficients and/or linear combinations of Fourier-Bessel coefficients.

6. Method according to claim 1 further comprising a calibration step allowing all or some of the parameters used in said step involving the determination of the encoding filters, to be issued.

7. Method according to claim 6, wherein said calibration step comprises, for at least one of said elementary sensors forming said acquisition means:

a substep involving the acquisition of signals that are representative of the acquisition capacities of said at least one sensor; and a sub-step involving the determination of parameters representative of electro-acoustic and/or structural characteristics of said at least one sensor.

8. Method according to claim 7, wherein said calibration step further comprises:

a substep involving the emission of a specific acoustic field toward said at least one sensor, said acquisition sub-step corresponding to the acquisition of the signals issued by this sensor when it is exposed to said specific acoustic field; and a sub-step involving the modelling of said specific acoustic field in a finite number of coefficients, in order to allow said sub-step involving the determination of parameters that are representative of electro-acoustic and/or structural characteristics of the sensor to be carried out.

9. Method according to claim 6, wherein said calibration step comprises a sub-step involving the reception of a finite number of signals that are representative of the electro-acoustic and structural characteristics of said sensors forming said acquisition means, which signals are used directly during said sub-step involving the determination of the electro acoustic and/or structural characteristics of said acquisition means.

10. Method according to claim 1, further comprising an input step, allowing all or some of the parameters used during said step involving the determination of the encoding filters, to be determined.

11. Method for representing an acoustic field comprising the steps of:

using acquisition means comprising one or more elementary sensors that are exposed to the acoustic field to obtain measurement signals that are measurements of the acoustic field by said acquisition means and that are dependant on characteristics of said acquisition means;

determining encoding filters that are representative of structural characteristics of said acquisition means;

processing the measurement signals by applying the encoding filters to the measurement signals to determine a finite number of coefficients representative over time and in a three-dimensional space of the acoustic field, the coefficients being representative of the acoustic field and substantially independent of characteristics of the acquisition means; and issuing a representation of the acoustic field based on the coefficients, wherein said determining step comprises:

a sub-step involving the determination of a sampling matrix that is representative of the acquisition capacities of said acquisition means;

a sub-step involving the determination of an intercorrelation matrix that is representative of the similarity between said measurement signals issued by the elementary sensors forming said acquisition means; and a substep involving the determination of an encoding matrix from said sampling matrix, said intercorrelation matrix and a parameter that is representative of a desired compromise between faithfulness of representation of the acoustic field and minimization of the background noise caused by the acquisition means, which matrix is representative of said encoding filters.

12. Method according to claim 11, wherein said sub-steps involving the determination of the matrices are carried out for a finite number of operating frequencies.

13. Method according to claim 11, wherein said step involving the determination of the sampling matrix is carried out, for each of said elementary sensors forming said acquisition means, from:

parameters that are representative of the position of said sensor relative to the center of said acquisition means; and/or a finite number of coefficients that are representative of the acquisition capacities of said sensor.

14. Method according to claim 13, wherein said step involving the determination of the sampling matrix is also carried out from at least one of the following parameters:

parameters that are representative of the frequency responses of all or some of the sensors;

parameters that are representative of the directivity diagrams of all or some of the sensors;

parameters that are representative of the maximum sensitivity direction of all or some of the sensors;

parameters that are representative of the power spectral densities of the background noise of all or some of the sensors;

a parameter specifying the order in which the representation is conducted;

a parameter that is representative of a list of coefficients, the power of which must be equal to the power of the corresponding coefficient in the acoustic field to be represented.

15. Computer program embodied in a computer-readable medium and comprising code instructions for implementing the steps of the method according to claim 1, when said program is executed on a computer.

16. Movable support comprising at least one operation processor and a non-volatile memory element readable by said processor, wherein said memory element comprises a program comprising code instructions for implementing the steps of the method according to claim 1, when said processor executes said program.

17. Device for representing an acoustic field, comprising:

acquisition means that have one or more elementary sensors that issue measurement signals when they are exposed to said acoustic field, the measurement signals being dependent on characteristics of said acquisition means; and a module for processing the measurement signals by applying encoding filters that are representative of at least the structural characteristics of said acquisition means to these measurement signals, in order to issue a signal that comprises a finite number of coefficients representative over time and in the three-dimensional space of said acoustic field, said coefficients being representative of said acoustic field and substantially independent of the characteristics of said acquisition means.

18. Device according to claim 17, wherein said encoding filters are also representative of electro-acoustic characteristics of said acquisition means.

19. Device according to claim 17, wherein it further comprises means for determining said encoding filters that are representative of structural and/or electro-acoustic characteristics of said acquisition means.

20. Device according to claim 19, wherein said means for determining encoding filters receive at the input at least one of the following parameters:

parameters that are representative of the positions, relative to center of said acquisition means, of all or some of the sensors;

a finite number of coefficients that are representative of the acquisition capacities of all or some of the sensors;

parameters that are representative of the frequency responses of all or some of the sensors;

parameters that are representative of the directivity patterns of all or some of the sensors;

parameters that are representative of the maximum sensitivity direction of all or some of the sensors;

parameters that are representative of the power spectral densities of the background noise of all or some of the sensors;

a parameter that is representative of the desired compromise between faithfulness of representation of the acoustic field and minimization of the background noise caused by the acquisition means;

a parameter specifying the order in which the encoding is conducted;

a parameter that is representative of a list of coefficients, the power of which must be equal to the power of the corresponding coefficient in the acoustic field to be represented.

21. Device according to claim 20, further comprising further means for determining all or some of the parameters received by said means for determining the encoding filters, said further means comprising at least one of the following elements:

means for inputting parameters; and/or calibration means.

22. Device according to claim 17, further comprising means for formatting said measurement signals, in order to issue a corresponding formatted signal.

* * * * *